Feb. 15, 1927. 1,617,940
W. P. CHASE
FLOWER DELIVERY AND EXHIBITION VEHICLE
Filed Nov. 5, 1925 2 Sheets-Sheet 1
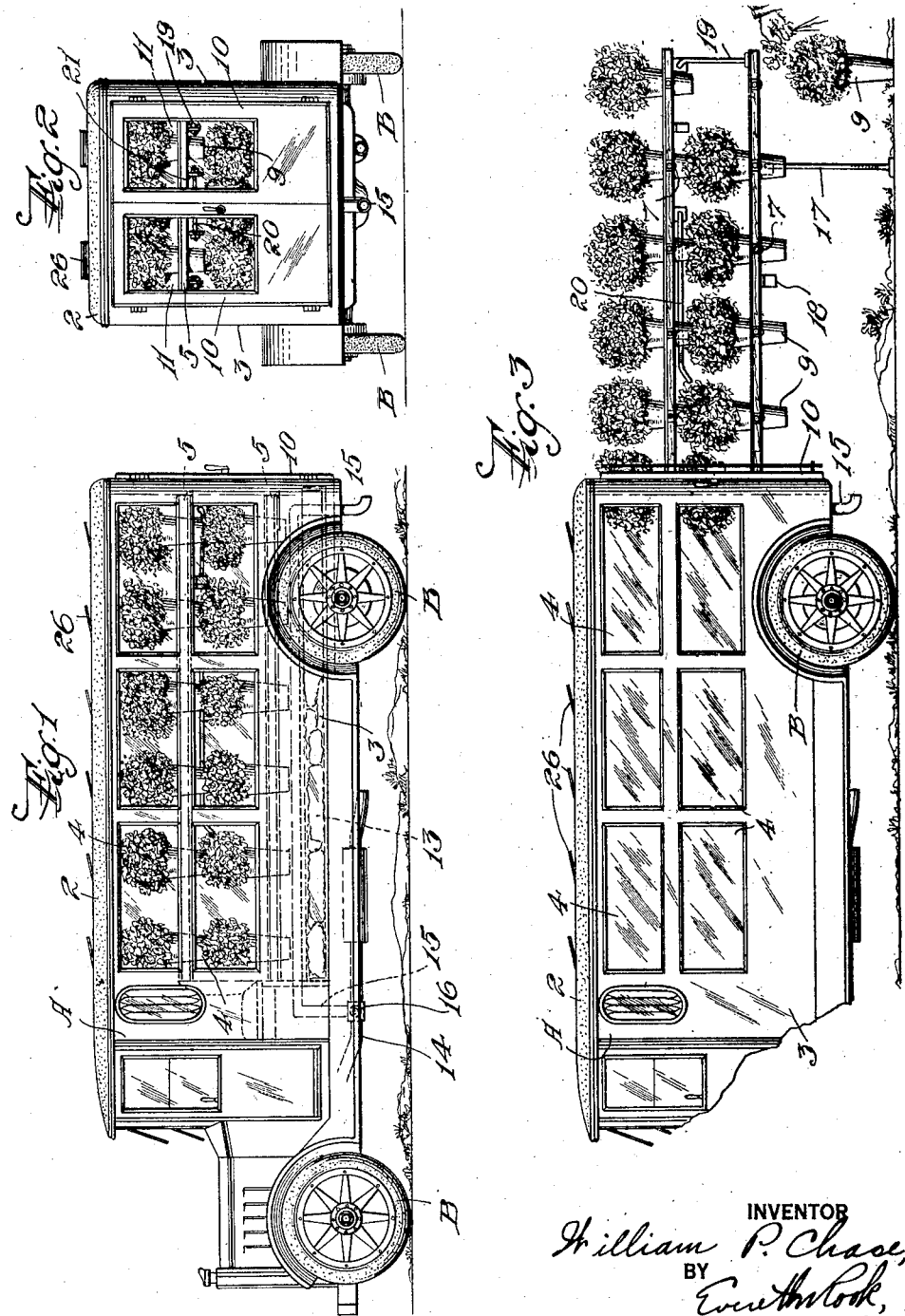
INVENTOR
William P. Chase,
BY
ATTORNEYS Feb. 15, 1927.
W. P. CHASE
1,617,940
FLOWER DELIVERY AND EXHIBITION VEHICLE
Filed Nov. 5, 1925 2 Sheets-Sheet 2
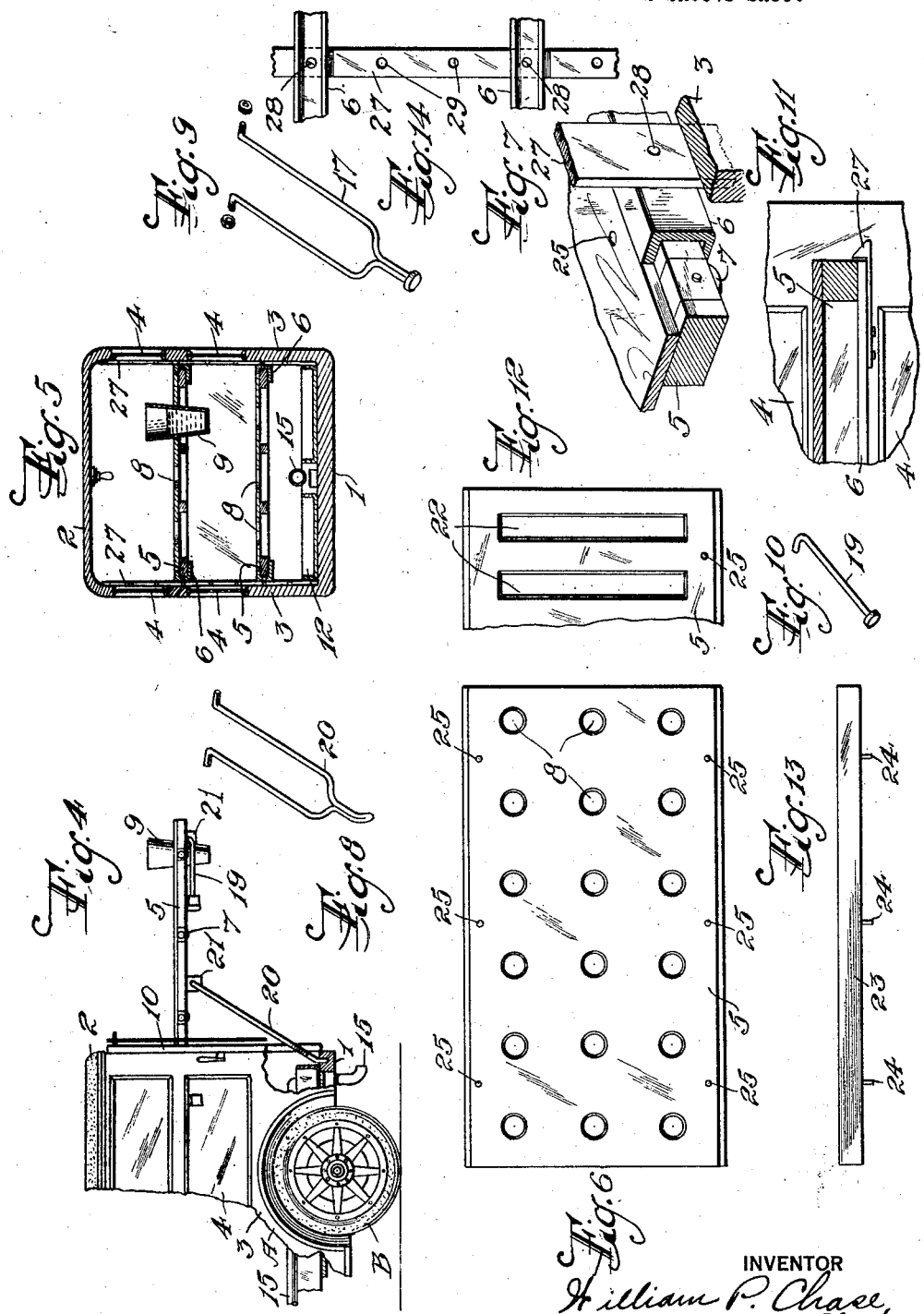

Patented Feb. 15, 1927.

1,617,940

UNITED STATES PATENT OFFICE.

WILLIAM P. CHASE, OF LIVINGSTON, NEW JERSEY.

FLOWER DELIVERY AND EXHIBITION VEHICLE.

Application filed November 5, 1925. Serial No. 67,163.

This invention relates particularly to a vehicle for transporting cut flowers, one object of the invention being to provide such a vehicle by which the flowers may be exhibited during the transportation or at any particular point in the route of transportation without removing the flowers from the vehicle.

Another object is to provide such a vehicle whereby the cut flowers and potted plants may be effectively preserved and protected against crushing each other.

A further object is to provide such a vehicle whereby cut flowers may be transported in water, for instance from the flower grower to the retailing florist or to the customer, so that the flowers are preserved and may be delivered in fresh condition.

Other objects are to provide such a vehicle embodying novel and improved features of construction whereby various kinds of flowers may be sorted and transported together without wrapping or placing them in boxes; to provide such a device whereby a plurality of bunches or groups of flowers may be transported in standing position out of contact with each other, so as to avoid crushing of the flowers; to provide a vehicle of the character described having transparencies or windows in its sides and means interiorly arranged with respect to said windows or transparencies for supporting containers for bunches of flowers, whereby the flowers may be transported in substantially vertical position and viewed through the windows or transparencies of the vehicle; to provide such a vehicle embodying novel and improved features of construction whereby a plurality of the flower containers may be easily and quickly placed in the vehicle at the same time in proper relation to said windows for exhibiting the flowers and without entering the vehicle, and whereby one container of flowers may be removed without individual handling of any of the other containers or all of the containers removed at one time, and to obtain other results and advantages as may be brought out by the following description.

In the accompanying drawings I have shown a preferred embodiment of the invention, but it will be understood that this is primarily for the purpose of illustrating the principles of the invention and that the details of construction may be modified or changed by those skilled in the art without departing from the spirit or scope of the invention.

Referring to said drawings, in which corresponding and like parts are designated throughout the several views by the same reference characters, Figure 1 is a side elevation of a flower delivering and exhibiting vehicle embodying the invention;

Figure 2 is a rear elevation thereof;

Figure 3 is a view similar to Figure 1 showing the flower supporting means extended out of the vehicle for access to the flowers;

Figure 4 is a fragmentary side elevation, partially in section, of the rear end of the vehicle showing one of the flower supporting shelves partially extended from the vehicle;

Figure 5 is a transverse vertical sectional view through the body of the vehicle;

Figure 6 is a top plan view of one of the shelves;

Figure 7 is a fragmentary sectional perspective view of the mounting of the shelves within the vehicle;

Figure 8 is a detached perspective view of the prop for supporting the upper shelf from the body of the vehicle when the said shelf is partially extended;

Figure 9 is a similar view of the prop for supporting the two shelves from the ground when they are both in extended position;

Figure 10 is a detached perspective view of one of the props for supporting the upper shelf upon the lower shelf when the shelves are extended;

Figure 11 is a fragmentary longitudinal sectional view showing the catch for holding the shelves against sliding out of the vehicle;

Figure 12 is a fragmentary plan view of a modified form of shelf;

Figure 13 is a side elevation of a side bar to be used upon the shelves when the flowers are to be laid upon the shelves in substantially horizontal position, and Figure 14 is a fragmentary front elevation of one of the standards for supporting the guideways for the shelves.

Specifically describing the present embodiment of the invention, the reference character A designates a vehicle body which may be mounted upon an automobile chassis and running gear including the wheels B, although it will be understood that the body A may be made mobile in any desired manner. The said body includes the bottom 1, top 2 and sides 3, and preferably each of the sides 3 has two series of a plurality of horizontally spaced transparencies or windows 4, the said series of windows being arranged substantially parallel to each other and longitudinally of the vehicle body.

Within the body are arranged two horizontal shelves or trays 5 which are mounted in guideways 6 secured to the sides 3 of the body and extending longitudinally thereof one immediately below each of the two series of windows 4. These trays 5 are longitudinally slidable in the guideways 6 in any suitable manner, but preferably the guideways are in the form of channels and the shelves are provided with rollers 7 for anti-frictionally mounting the shelves within said channels (see Figures 3 and 7). The shelves 5 are adapted to support the cut flowers and potted plants to be transported and exhibited, and the shelves may be formed with a plurality of openings 8 to removably receive vases or cups 9 which are adapted to contain water and receive the stems of the cut flowers to be transported; and flower pots containing plants may be placed in said openings or otherwise arranged on the shelves. It will be noted that the vases 9 are substantially frusto-conical and the openings 8 are correspondingly shaped so that the vases are held against slipping downwardly through the openings. The shelves 5 are slidable longitudinally of the body in the guideways 6 through the rear end of the body A, and doors 10 may be provided for normally closing the rear end of the body, said doors also having transparencies or windows 11.

In loading the vehicle with flowers for transportation, the shelves 5 are first completely withdrawn from the guideways 6, or pulled outwardly to their limit as shown in Figure 3. The cut flowers to be transported are divided into bunches and each bunch inserted into one of the vases 9 in which water has previously been placed. The vases 9 are then inserted into the openings 8 of the shelves 5, after which the shelves are pushed inwardly of the vehicle body and the doors 10 closed. It will be noted that the individual bunches of flowers are separated from each other and are supported in substantially vertical position. Accordingly, the flowers are visible through the windows 4 and 11 and there is no possibility of the flowers becoming crushed as is common where flowers are laid in horizontal position upon each other. The water in the vases 9 and the evaporation of the water within the body which keeps the air moist, preserves the flowers and maintains them in fresh condition.

It may be desirable in hot weather to provide means for keeping the interior of the body A cool, and accordingly I may provide pans or other receptacles 12 on the bottom of the body in which may be placed cakes of ice 13 which will cool the air within the body. In freezing weather, it may be desirable to warm the air within the body to prevent the flowers from freezing, and for this purpose I may utilize the exhaust of the automobile engine. One manner of doing this is shown in Figure 1 of the drawings where the main exhaust pipe 14 is provided with a branch pipe 15 which extends upwardly into the vehicle body and longitudinally along the bottom thereof, as shown in Figure 5. Communication between the main exhaust pipe 14 and the branch pipe 15 may be controlled by a suitable valve 16.

When it is desired to remove the bunches of flowers from the vehicle for any purpose, for instance in making deliveries to customers, one or both of the slides 5 is pulled outwardly of the body A and the vase or vases 9 containing the desired bunch or bunches of flowers removed. When the lowermost shelf 5 is pulled outwardly of the body A to its limit, it is desirable to support the outer end of the shelf to prevent breaking or warping thereof, and for this purpose I may provide a prop 17 pivotally connected to the bottom of the shelf and adapted to engage the ground when the shelf is extended, as shown in Figure 3. The prop is normally swung upwardly against the shelf and held there by any suitable means such as a spring clip 18. When both the upper and lower shelves are extended, it is desirable to support the upper shelf on the lower shelf, and accordingly I may provide a prop 19 at each side of the shelf at the outer end thereof to engage the top of the bottom shelf, as shown in Figure 3. For supporting the top shelf when it is only partially extended and when the lower shelf is within the body, I may provide an intermediate prop 20 on the bottom of the top shelf, the free end of which is adapted to rest upon the bottom of the body A, as shown in Figure 4 of the drawings.

These props 17, 19 and 20 may be of any suitable construction, but I have shown them as formed of heavy rods pivotally connected to brackets 21 on the respective shelves.

A modified form of shelf is shown in Figure 12 in which elongated rectangular openings 22 extending transversely of the shelves are provided instead of the openings 8, the openings 22 being adapted to receive elongated frusto-pyramidal vases or cups.

When it is desired to transport large or long-stemmed flowers in the vehicle, the vases 9 are dispensed with and the flowers laid horizontally upon the shelves 5. Preferably, side bars 23 are separably secured to the shelves to prevent the flowers from rolling off the shelves. In the present instance these bars 23 are shown as connected to the shelves by dowels 24 on the bars to enter openings 25 in the shelves. With such a construction, all the flowers on the shelf may be removed at the same time whereby damage by individual handling and bunching is prevented.

To ensure that the air within the body is fresh, I may provide suitable ventilators 26. To prevent the shelves from accidentally sliding outwardly of the body A, I may provide spring latches 27 at the outer ends of the guideways 6 to engage the rear ends of the shelves when the latter are in their normal position within the body. Before the shelves are pulled outwardly, the latches 27 are depressed to move them out of the path of movement of the corresponding shelf.

With such a construction, it is possible to place a large number of bunches of flowers and potted plants within a vehicle at the same time in proper relation to each other and to the windows 4 for exhibiting the flowers, and to remove all of the bunches and potted plants at once or any bunch or plant separately and without individual handling of the other bunches or plants. The flowers are constantly in view while within the body A and artistically arranged within the vases so as to present a pleasing appearance. The possibility of transporting the flowers in substantially vertical position and with their stems submerged in water enables the flowers to be transported over long distances without danger of wilting or becoming crushed.

The channels 6 may be mounted upon the walls of the body A in any suitable manner, but preferably a plurality of vertical standards 27 are arranged in spaced relation longitudinally of the body on the interior of the sides 3 thereof and the channels 6 are fastened to said standards by screws 28, as shown in Figures 5, 7 and 14. The standards 27 are formed with a plurality of openings 29 to receive the screws 28 (see Figure 14) so that more or less shelves may be accommodated and the spacing of the shelves varied as desired.

While I have shown and described the body A as particularly designed for a vehicle, it will be understood that the invention is susceptible of embodiment in a stationary casing or housing.

Having thus described the invention, what I claim is:

1. A vehicle body having a side wall, said side wall having non-transparent portions extending longitudinally thereof and having longitudinal transparent portions between the said non-transparent portions, and horizontally movable shelves slidably arranged opposite non-transparent portions of said body so as to be hidden thereby, said shelves each providing means for supporting a plurality of vessels in upright and fixed relation to each other so as to exhibit contents of said vessels and prevent said vessels becoming tilted or disarranged by motion of the vehicle and also enable all of said vessels of each shelf to be placed in and removed from said body simultaneously and independent of the vessels of the other shelf.

2. In combination with a vehicle having a body and an opening in said body, movable shelves slidable into and out of said body through the opening, guideways in said body for supporting said shelves, means for independently supporting the projecting ends of said shelves when singly withdrawn from the body, and means for supporting one shelf from the other when both are withdrawn from the body.

3. In combination with a vehicle having a body and an opening in said body, upper and lower movable shelves slidable into and out of said body through the opening, guideways in said body for supporting said shelves, means for supporting the lower shelf from the ground when withdrawn from the body, and means for supporting the upper shelf from the lower one when said upper shelf is withdrawn from the body.

WILLIAM P. CHASE.